United States Patent
Mukasa et al.

(10) Patent No.: US 6,667,456 B2
(45) Date of Patent: Dec. 23, 2003

(54) LASER WELDING METHOD AND A LASER WELDING APPARATUS

(75) Inventors: Koichi Mukasa, Hokkaido (JP); Masayuki Ikeda, Hokkaido (JP); Kazuhisa Sueoka, Hokkaido (JP); Eisuke Ueda, Hokkaido (JP); Hisao Kadono, Hokkaido (JP); Masakazu Mutoh, Hokkaido (JP)

(73) Assignee: Hokkaido University, Sapporo (JP)

( * ) Notice: Subject to any disclaimer, the term of this patent is extended or adjusted under 35 U.S.C. 154(b) by 7 days.

(21) Appl. No.: 09/850,839

(22) Filed: May 8, 2001

(65) Prior Publication Data

US 2002/0008090 A1 Jan. 24, 2002

(30) Foreign Application Priority Data

May 9, 2000 (JP) .......................... 2000-135559

(51) Int. Cl.$^7$ .......................... B23K 26/14; B23K 26/20
(52) U.S. Cl. .......................... 219/121.63; 219/121.64; 219/121.84
(58) Field of Search .................. 219/121.63, 121.64, 219/121.84

(56) References Cited

U.S. PATENT DOCUMENTS 5,308,951 A  * 5/1994 Mori ...................... 219/121.84

FOREIGN PATENT DOCUMENTS

| DE | 39 23 829 A1 | 1/1991 | |
|---|---|---|---|
| EP | 0 600 250 A1 | 6/1994 | |
| GB | 2163692 A * | 3/1986 | |
| JP | 56-151191 | 11/1981 | |
| JP | 57-130791 | 8/1982 | |
| JP | 58212888 | 12/1983 | |
| JP | 60049887 | 3/1985 | |
| JP | 61-229491 A * | 10/1986 | |
| JP | 62-29888 | 2/1987 | |
| JP | 63-76785 | 4/1988 | |
| JP | 2-99292 | 4/1990 | |
| JP | 04313485 | 11/1992 | |
| JP | 4-333388 A * | 11/1992 | ............ 219/121.63 |
| JP | 05-169288 | 7/1993 | |
| JP | 6-7984 A * | 1/1994 | ............ 219/121.64 |
| JP | 06210479 | 8/1994 | |
| JP | 11-789 | 1/1999 | |
| JP | 11-58063 | 3/1999 | |
| JP | 11-285883 A * | 10/1999 | |

OTHER PUBLICATIONS

Ser. No. 09/851,261, filed May 8, 2001, No Publication Date.
Ser. No. 09/850,828, filed May 8, 2001, No Publication Date.
English Translation of Japan Patent Document 57–130,791.

* cited by examiner

Primary Examiner—Geoffrey S. Evans
(74) Attorney, Agent, or Firm—Knobbe Martens Olson & Bear, LLP

(57) ABSTRACT

A coaxial nozzle to blow an inert gas on a part to be welded is provided, and at least one discharging nozzle to blow a compressed shielding gas around the part to be welded so as to cover the inert gas is provided at the outer side of the coaxial nozzle. Then, a laser oscillator to oscillate a laser is provided, and a condenser to converge the laser, and thus, melt the part to be welded through the irradiation of the converged laser is built in. Moreover, an evacuating nozzle to evacuate gases around the melting parts is provided.

12 Claims, 3 Drawing Sheets

LASER WELDING METHOD AND A LASER WELDING APPARATUS

BACKGROUND OF THE INVENTION

1) Field of the Invention

This invention relates to a laser welding method and a laser welding apparatus, particularly to a laser welding method and a laser welding apparatus using a small laser welding head which can precisely weld bodies to be welded in a good quality without an entire gas shielding for the bodies.

2) Description of Related Art

Recently, with the advance of high-power laser welding technique, a high-power $CO_2$ laser welding technique is used for a macro welding, and a YAG laser welding technique is used for a precise welding. The reason is that the above techniques have the following advantages, in comparison with other welding techniques such as a TIG welding technique and a MIG welding technique.
(1) Large welding ratio (welding depth/melting bead width), and small processing strain
(2) High speed welding, and being capable of providing a high quality welded joint through little remaining thermal efficiency and repressing the increase of crystalline grains
(3) Being capable of performing a welding process in a canister with a transparent window having a peculiar atmosphere therein
(4) Being capable of welding different kinds of metal or a metal and a non-metal Moreover, the above techniques have the following advantages, in comparison with an electron beam welding technique.
(5) Not be influenced by the magnetic field of bodies to be welded, and thus, being capable of welding a magnetic material
(6) Not requiring a vacuum chamber and a X-ray shielding.

On the contrary, in the above-mentioned laser welding technique, the melting part of the bodies to be welded is chemically reacted to an atmosphere gas around the bodies, and particularly, if the melting part is oxidized by a nearby air, the weld bead is disadvantageously degraded. As a result, a coaxial nozzle is attached to the laser welding head, and thus, for preventing the oxidization of the melting part, a shielding gas such as Ar gas or He gas is blown on a part to be welded of the bodies to be welded, which corresponds to the melting part, at the same time when a converged laser is irradiated to the part to be welded.

However, even if the shielding gas is blown on the part to be welded, the melting part often chemically reacts, and thus, is often oxidized. As a result, an exogenous material is generated at and taken in the welded part of the bodies to be welded through the chemical reaction and the oxidization, resulting in the degradation of the welded part.

Consequently, for preventing the above chemical reaction and oxidization, it is obliged to perform the laser welding process in a steel case having a shielding gas to prevent the oxidization (chemical reaction) after the steel case is evacuated. On account of this process, a large-scale and complicate laser welding apparatus is needed.

Furthermore, the above shielding gas may be partially taken in the weld bead by a large amount, so that, if the welded body is employed under an ultra-high vacuum atmosphere of not more than $10^{-5}$ Pa or a hyperultra-high vacuum atmosphere of not more than $10^{-9}$ Pa, the partially taken-in shielding gas is gradually emitted, resulting in the degradation of the vacuum degree.

SUMMERY OF THE INVENTION

It is an object of the present invention to bring out the advantages and characteristics of the above laser welding by ironing out the above-mentioned matters, that is, to provide a laser welding method and a laser welding apparatus which can prevent the oxidization and the chemical reaction of the welded part of the bodies to be welded by shielding parts to be welded of the bodies perfectly from an outside air and maintaining the shielded atmosphere, and can reduce the shielding gas emission from the weld bead for the welded body be able to be employed in such an ultra-high vacuum atmosphere or a hyperultra-high vacuum atmosphere.

For achieving the above object, this invention is directed at a laser welding method for welding plural bodies to be welded comprising the steps of:

blowing an inert gas on a part to be welded from a coaxial nozzle, blowing a compressed shielding gas around the part to be welded so as to cover the inert gas from at least one discharging nozzle provided at the outer side of the coaxial nozzle, and irradiating a converged laser onto the part to be welded, and thus, melting the part under the shielded condition from an outside air to weld the plural bodies.

Moreover, this invention is directed at a laser welding apparatus for welding plural bodies to be welded comprising:

a coaxial nozzle to blow an inert gas on a part to be welded, at least one discharging nozzle, provided at the outer side of the coaxial nozzle, to blow a compressed shielding gas around the part to be welded so as to cover the inert gas, a laser oscillator to oscillate a laser, and a condenser to converge the laser, and thus, melt the part to be welded through the irradiation of the converged laser under the shielded condition from an outside air to weld the plural bodies.

The other objects, configurations and advantages will be explained in detail, with reference to the attaching drawings.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to figures.

Figure 1:
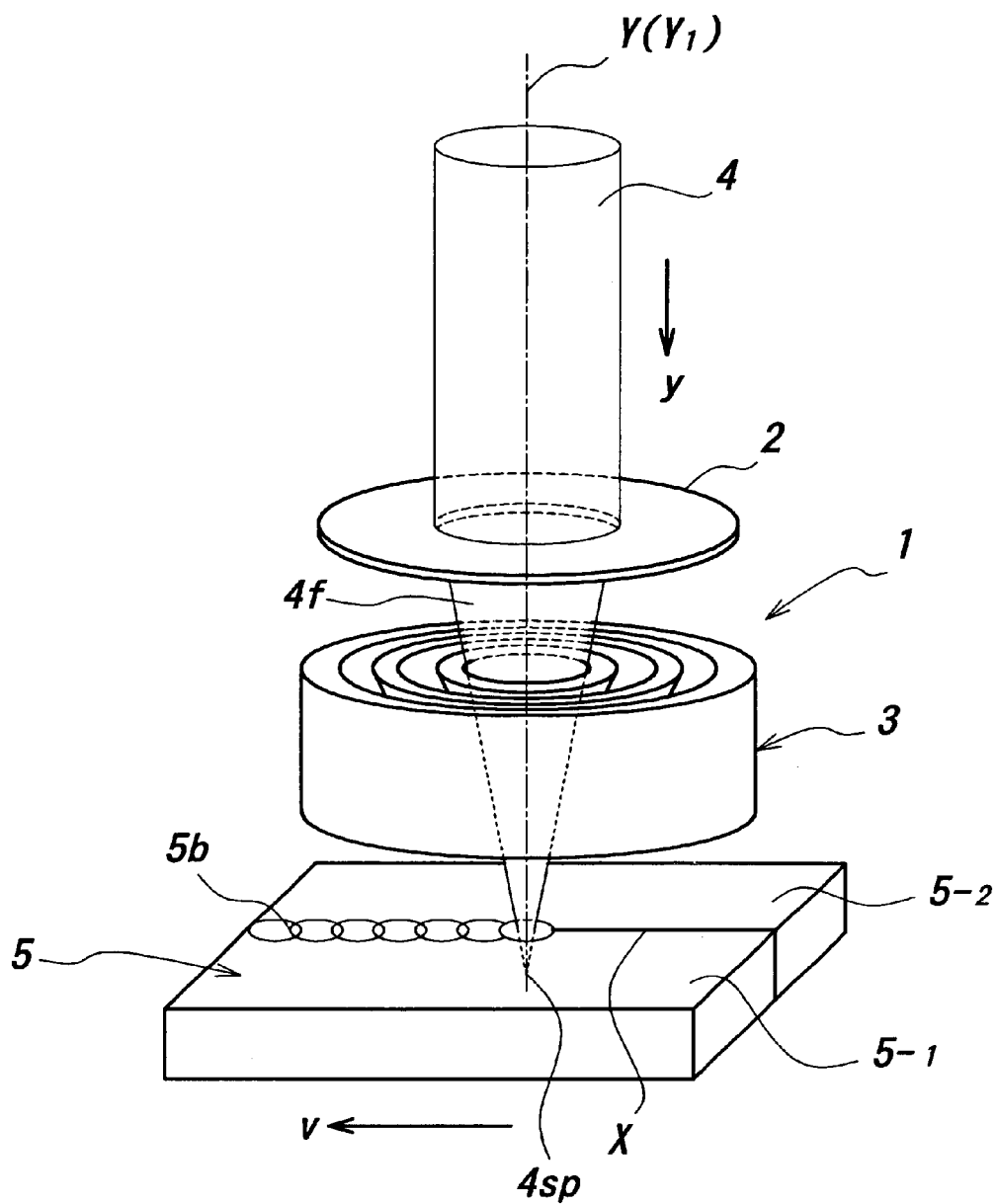
FIG. 1 is a perspective view schematically showing a welding head in the laser welding apparatus of the present invention.
Figure 2:
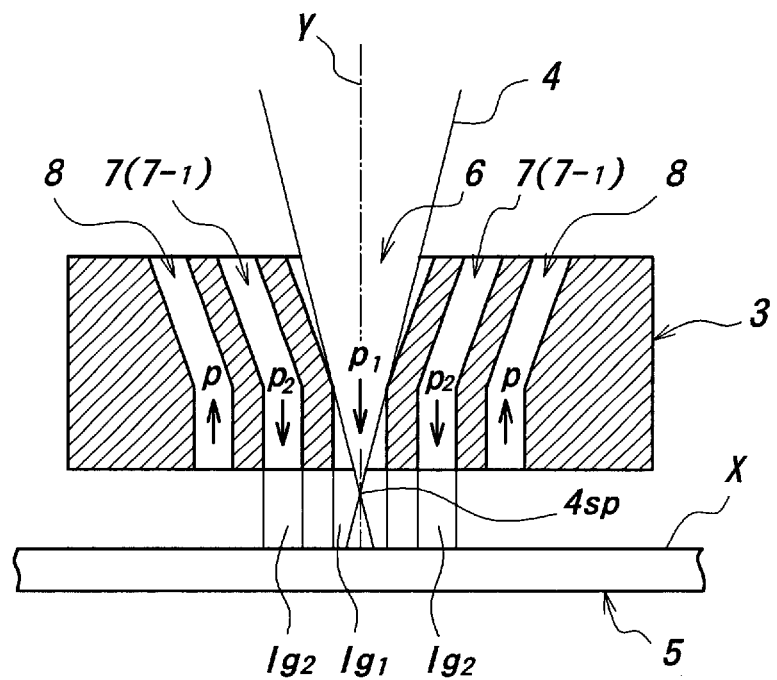
FIG. 2 is a cross sectional view schematically showing the nozzle of the welding head shown in FIG. 1.

FIG. 1 is a perspective view schematically showing a welding head in the laser welding apparatus of the present invention, and FIG. 2 is a cross sectional view schematically showing the nozzle of the welding head shown in FIG. 1.

Figure 3:
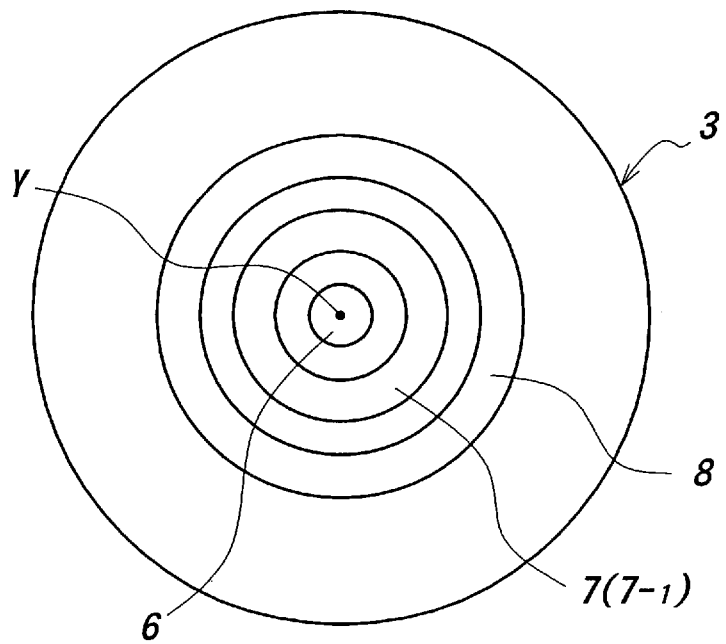
FIG. 3 is an elevational view of the nozzle shown in FIG. 2, taken on line "3—3"
Figure 4:
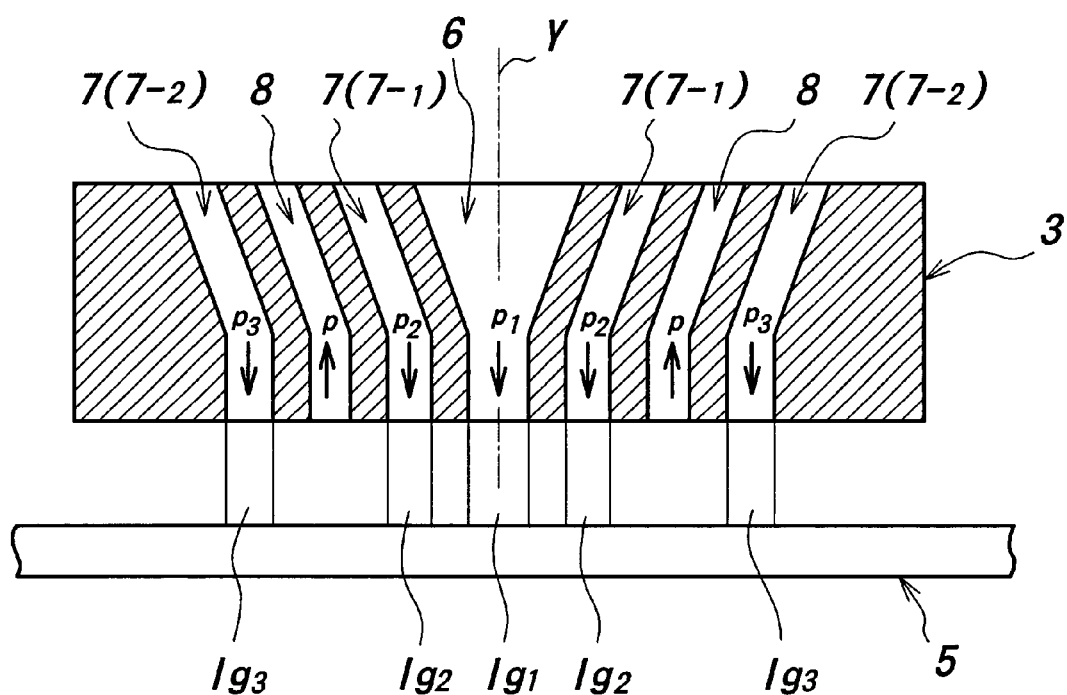
FIG. 4 is a cross sectional view showing another nozzle of a welding head in the laser welding apparatus of the present invention.

FIG. 3 is an elevational view of the nozzle shown in FIG. 2, taken on line "3—3", and FIG. 4 is a cross sectional view showing another nozzle of a welding head in the laser welding apparatus of the present invention.

A laser welding head 1 depicted in FIG. 1 has a condenser 2 as an optical system to converge a laser 4 and a nozzle 3. In FIGS. 1–4, the laser 4 travelling in an arrow y direction passes through the condenser 2, and focuses on a part 5b to be weld between two bodies 5 (bodies 5-1 and 5-2 in FIG. 1) to be weld or the nearby area to form a focused spot 4sp. In this embodiment, the two bodies 5-1 and 5-2 are welded, but three or over bodies may be welded. Moreover, in this embodiment, the part 5b to be welded exists alongside a welding line X. Instead of the condenser 2, an optical mirror system may be employed.

The nozzle 3 has a coaxial nozzle 6 at its center. The coaxial nozzle 6 serves as a converged laser-discharging hole for the part 5b to be welded between the bodies 5-1 and 5-2 to be welded and a cylindrical compressed inert gas-discharging hole, and can match the axes $Y_1$ and Y of the converged laser and the discharging holes substantially.

Moreover, the nozzle 3 has at least one discharging nozzle 7 around the coaxial nozzle 6. The discharging nozzle 7 discharges a compressed shielding gas for the part to be welded. In FIGS. 2 and 3, one discharging nozzle 7-1 is provided, and in FIG. 4, two discharging nozzles 7-1 and 7-2 are provided.

Next, the operation of the laser welding head 1 will be described hereinafter.

During the welding, the laser 4, which is oscillated from an oscillator such as a $CO_2$ laser oscillator or a YAG laser oscillator generally provided on the laser welding apparatus, is converged via the condenser 2, and the converged laser 4f is irradiated on the part 5b (along the welding line X) to be welded between the bodies 5-1 and 5-2 to be welded through the coaxial nozzle 6 serving as the above discharging holes. In this case, the focusing spot 4sp is positioned slightly above the position 5b.

At the same time, a compressed inert gas $Ig_1$ having a regulated gauge pressure $p_1$ is discharged cylindrically for the part 5b in an arrow direction, and compressed shielding gases $Ig_2$ and $Ig_3$ having regulated gauge pressures $p_2$ and $p_3$ are discharged in laminar flow for the position 5b in arrow directions.

Just then, as shown in FIGS. 2 and 4, the shielding gases $Ig_2$ and $Ig_3$ cover the inert gas $Ig_1$. Therefore, the discharging nozzle 7 is preferably provided coaxially for the coaxial nozzle 6. Moreover, in this case, it is desired that the gases $Ig_1$–$Ig_3$ are discharged in constant flow. And then, it is also desired that the regulated gauge pressures $p_1$–$p_3$ satisfy the relation of $p_1 > p_2 \geq p_3$. Herein, the states of the inert gas and the shielding gas between the nozzle 3 and the bodies 5 to be welded are depicted by the respective solid lines.

The shielding gases $Ig_2$ and $Ig_3$ discharged from the nozzle 3 form a strong barrier with the inert gas $Ig_1$ around the part 5b to be welded against an outside air, and the gases $Ig_1$–$Ig_3$ are discharged outside after they arrives at the position 5b or the nearby area. Therefore, gases to chemically react with the position 5b, particularly to oxidize the position 5b can be removed from the nearby area.

As a result, oxides or other compounds can not be generated at the position 5b and the formation of spatter can be repressed, so the welding can be performed in good condition. Moreover, since the shielding is performed locally around the position 5b, the welding head can be downsized extremely, and thus, the manufacturing cost can be decreased because another apparatus is not needed. Furthermore, on account of the small size of the welding head, even very small body to be welded can be precisely welded in high quality.

Moreover, it is desired that the nozzle 3 has an evacuating nozzle 8 in the outside of the discharging nozzle 7 having a decompressed pressure p. In the case of that the two discharging nozzle 7 are provided as shown in FIG. 4, the evacuating nozzle 8 is provided between the inner and the outer discharging nozzles 7-1 and 7-2. The above shielding gas and the inert gas $Ig_1$–$Ig_3$ are evacuated by the evacuating nozzle 8 when they are discharged.

Thereby, these gases are made flown smoothly around the position 5b to be welded, so that the position 5b can be more effectively shielded from the outside air. And more, because of the smooth flow, the shielding gas or the like are prevented from diffusing to and contaminating the position 5b to be welded.

Although the evacuating nozzle 8 may be arranged at any positions around the coaxial nozzle 6, it is advantageous that it is arranged in the outside of the discharging nozzle 7 as shown in FIGS. 2 and 3. Then, in the case of that the two discharging nozzle 7-1 and 7-2 are provided as shown in FIG. 4, it is advantageous that the evacuating nozzle 8 is arranged therebetween. In the latter case, the position 5b to be welded can be more effectively shielded against the outside air. The arrangement of the evacuating nozzle 8 is determined on the required shielding level.

The evacuating nozzle 8 is preferably arranged so that its axis can correspond with the axes of the coaxial nozzle 6 and the discharging nozzle 7 for shielding the position 5b to be welded against the outside air effectively.

Moreover, due to the similar reason, at least the discharging hole of the discharging nozzle 7 and the evacuating hole of the evacuating nozzle 8 have preferably cylindrical shapes, respectively. And at least the discharging hole of the coaxial nozzle has preferably columnar shape. As the above-mentioned gases $Ig_1$–$Ig_3$, an inert gases such as $N_2$ gas, Ar gas or He gas may be employed.

As mentioned above, for shielding the position 5b to be welded against the outside air, the relation of $p_1 > p_2 \geq p_3$ is preferably satisfied. The welding operation is performed continuously along the welding line X at a speed v.

Although the present invention was described in detail with reference to the above examples, this invention is not limited to the above disclosure and every kind of variation and modification may be made without departing from the scope of the present invention. For example, using the laser welding apparatus having the above-mentioned plural welding heads, a good quality simultaneous multi-point spot welding can be performed precisely. Moreover, if the power of the laser 4 is adjusted, a superposing welding and a deep welding may be performed.

As mentioned above, according to the present invention, since the position to be welded can be shielded against the outside air, it is protected from the chemical reaction thereof with the composition such as oxygen. Therefore, the laser welding method and the laser welding apparatus of the present invention can be employed for an ultra-high vacuum vessel to attain a vacuum degree of not more than $10^{-5}$ Pa, a hyperultra-high vacuum vessel to attain a vacuum degree of not more than $10^{-9}$ Pa, a Mott scattering apparatus or a small urtraprecise instrument used in an ultra-high vacuum atmosphere.

What is claimed is:

1. A laser welding method for welding plural bodies to be welded comprising the steps of:

blowing a first inert gas on a part to be welded from a coaxial nozzle, blowing a compressed shielding gas comprising a second inert gas around the part to be welded so as to cover the first inert gas, from at least one discharging nozzle, the forefront of which is formed parallel to the forefront of the coaxial nozzle and which is provided at the outer side of the coaxial nozzle, and irradiating a converged laser onto the part to be welded, and thus, melting the part under the shielded condition from an outside air to weld the plural bodies.

2. A laser welding method as defined in claim 1, wherein the inert gas and the shielding gas are discharged in constant flow.

3. A laser welding method as defined in claim 1 or 2, wherein the inert gas is blown in columnar shape, and the shielding gas is blown cylindrically.

4. A laser welding method as defined in claim 1 or 2, wherein the at least one discharging nozzle comprises an inner discharging nozzle and an outer discharging nozzle, and the gauge pressure P1 of the inert gas and the gauge pressures p2 and p3 of the inner and the outer discharging nozzles satisfy the relation of $p_1 > p_2 > p_3$.

5. A laser welding method as defined in claim 1 or 2, further comprising the step of evacuating gases around the melting part by an evacuating nozzle.

6. A laser welding apparatus for welding plural bodies to be welded comprising:

a coaxial nozzle to blow a first inert gas on a part to be welded, at least one discharging nozzle, provided at the outer side of the coaxial nozzle, to blow a compressed shielding gas comprising a second inert gas around the part to be welded so as to cover the first inert gas, the forefront of the discharging nozzle being formed parallel to the forefront of the coaxial nozzle, a laser oscillator to oscillate a laser, and a condenser to converge the laser, and thus, melt the part to be welded through the irradiation of the converged laser under the shielded condition from an outside air to weld the plural bodies.

7. A laser welding apparatus as defined in claim 6, wherein the at least one discharging nozzle is provided coaxially for the coaxial nozzle.

8. A laser welding apparatus as defined in claim 6 or 7, further comprising an evacuating nozzle to evacuate gases around the melting parts.

9. A laser welding apparatus as defined in claim 8, wherein the at least one discharging nozzle comprises an inner and an outer coaxial discharging nozzles, and the evacuating nozzle is provided between the inner and the outer coaxial discharging nozzles.

10. A laser welding apparatus as defined in claim 8, wherein the evacuating nozzle is provided coaxially for the coaxial nozzle and the at least one discharging nozzle.

11. A laser welding apparatus as defined in claim 10, wherein the at least one discharging nozzle and the evacuating nozzle have discharging holes having cylindrical shapes.

12. A laser welding apparatus as defined in claim 10, wherein the at least one discharging nozzle comprises an inner and an outer coaxial discharging nozzles, and the evacuating nozzle is provided between the inner and the outer coaxial discharging nozzles.

* * * * *